United States Patent
Lee

(10) Patent No.: US 7,383,043 B2
(45) Date of Patent: Jun. 3, 2008

(54) WIRELESS NETWORK SYSTEM CAPABLE OF TRACKING A LOCATION OF A MOBILE STATION AND A METHOD FOR TRACKING A LOCATION OF THE MOBILE STATION

(75) Inventor: June-Seo Lee, Kyonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 551 days.

(21) Appl. No.: 10/642,233

(22) Filed: Aug. 18, 2003

(65) Prior Publication Data
US 2004/0043774 A1 Mar. 4, 2004

(30) Foreign Application Priority Data
Aug. 28, 2002 (KR) ................ 10-2002-0051227

(51) Int. Cl.
*H04Q 7/20* (2006.01)
(52) U.S. Cl. ............... 455/433; 455/404.2; 455/456.1; 455/457; 340/539.13; 340/825.36; 340/825.49; 342/450; 342/457
(58) Field of Classification Search ........... 455/433, 455/404.2, 414.2, 456.1, 457; 342/450, 457; 340/539.13, 825.36, 825.49, 539.12
See application file for complete search history.

(56) References Cited

U.S. PATENT DOCUMENTS 5,537,610 A 7/1996 Mauger et al.

(Continued)

FOREIGN PATENT DOCUMENTS

CN 1365226 8/2002

(Continued)

OTHER PUBLICATIONS

Australian Examination Report; dated Jul. 5, 2004.

(Continued)

*Primary Examiner*—Nghi H. Ly
(74) *Attorney, Agent, or Firm*—Robert E. Bushnell, Esq.

(57) ABSTRACT

A system and a method for tracking a location of a private wireless network subscriber can precisely track and find out a location of a subscriber even within a service zone of a base station and can realize this precise tracking in a simple fashion. In a private wireless network having a plurality of repeaters dispersedly installed in sector zones of a private Base Transceiver Station (pBTS), the subscriber location tracking system of the present invention includes a private Base Station Controller (pBSC) connected to the pBTS and a Local Area Network (LAN) and having a Visitor Location Register (VLR), a server connected to the LAN, and at least one client connected to the LAN. The pBSC stores location information in the VLR when a mobile station executes location registration, and confirms a location and state of a mobile station by dummy paging and updates its location information stored in the VLR when the relevant mobile station keeps up an idle state during a certain period. The server inquires about the location information stored in the VLR and transmits it to the client. The client receives location information from the server and provides a user with a location and state of a mobile station according to the received location information.

16 Claims, 4 Drawing Sheets

U.S. PATENT DOCUMENTS

| | | | |
|---|---|---|---|
| 5,842,131 A * | 11/1998 | Yamane | 455/456.1 |
| 6,018,573 A | 1/2000 | Tanaka | |
| 6,032,042 A | 2/2000 | Kauppi | |
| 6,038,451 A * | 3/2000 | Syed et al. | 455/445 |
| 6,041,231 A | 3/2000 | Suzuki | |
| 6,101,394 A | 8/2000 | Illidge | |
| 6,198,927 B1 | 3/2001 | Wright et al. | |
| 6,199,045 B1 * | 3/2001 | Giniger et al. | 705/1 |
| 6,212,382 B1 * | 4/2001 | Watson et al. | 455/444 |
| 6,256,503 B1 * | 7/2001 | Stephens | 455/456.6 |
| 6,321,091 B1 * | 11/2001 | Holland | 455/414.2 |
| 6,418,372 B1 * | 7/2002 | Hofmann | 701/209 |
| 6,424,840 B1 * | 7/2002 | Fitch et al. | 455/456.1 |
| 6,487,413 B1 * | 11/2002 | Suojasto | 455/446 |
| 6,510,318 B1 | 1/2003 | Minagawa | |
| 6,516,193 B1 * | 2/2003 | Salmela et al. | 455/432.3 |
| 6,522,888 B1 * | 2/2003 | Garceran et al. | 455/456.3 |
| 6,542,497 B1 * | 4/2003 | Curry et al. | 370/352 |
| 6,591,101 B1 * | 7/2003 | Shimbori | 455/435.1 |
| 6,718,173 B1 * | 4/2004 | Somani et al. | 455/456.1 |
| 6,952,181 B2 * | 10/2005 | Karr et al. | 342/457 |
| 2001/0014584 A1 * | 8/2001 | Oshgiri | 455/3.01 |
| 2002/0107003 A1 * | 8/2002 | Martin et al. | 455/412 |
| 2003/0040313 A1 * | 2/2003 | Hogan et al. | 455/435 |

FOREIGN PATENT DOCUMENTS

| | | |
|---|---|---|
| GB | 1 134 995 | 9/2001 |
| JP | 10-174145 | 6/1998 |
| JP | 2000-341739 | 12/2000 |
| JP | 2000-341793 | 12/2000 |
| WO | WO 93/25050 | 12/1993 |
| WO | WO 97/24898 | 7/1997 |
| WO | WO 00/38467 | 6/2000 |
| WO | WO 02/21873 | 3/2002 |

OTHER PUBLICATIONS

Chinese Office Action for Chinese Patent Application No. 03155345.1, dated Jun. 10, 2005.(English Translation attached).

Japanese Office Action of the Japanese Patent Application No. 2003-296680, mailed on Apr. 11, 2006.

* cited by examiner

WIRELESS NETWORK SYSTEM CAPABLE OF TRACKING A LOCATION OF A MOBILE STATION AND A METHOD FOR TRACKING A LOCATION OF THE MOBILE STATION

CLAIM OF PRIORITY

This application makes reference to, incorporates the same herein, and claims all benefits accruing under 35 U.S.C. §119 from an application for SUBSCRIBER LOCATION PURSUIT SYSTEM AND METHOD IN PREMISE WIRELESS NETWORK earlier filed in the Korean Industrial Property Office on 28 Aug. 2002 and there duly assigned Serial No. 2002-51227.

BACKGROUND OF THE INVENTION

1. Field of the Invention

The present invention relates to a private wireless network, and more particularly to a system and a method for providing information about a location of a private wireless network subscriber.

2. Description of the Related Art

A private wireless network (also referred to as a Private Mobile Network) generally provides a mobile station (MS) of a private wireless network subscriber with a mobile communication service in a restricted zone such as a specific building, that is, on a premise. As one example of a private wireless system for providing such a mobile communication service, an "InfoMobile" system having been developed by Samsung Electronics Co., Ltd., Korea can be cited. This InfoMobile system provides a variety of wireless calls, data services and Internet Protocol (IP) terminal services together with Private Automatic Branch Exchange (PABX) functions.

In the private wireless network as mentioned above, the mobile station must necessarily notify the private wireless system of its location, slot mode, power-up/-down state, etc., in order to be serviced with an incoming call. To realize this, the private wireless network has a location registration function for managing states and situations of mobile station's movement in real time as in a Public Land Mobile Network (PLMN). Even without making a call, the mobile station occasionally executes location registration, that is, a work for notifying the private wireless system of its location and state, according to which the notified locations and states of the mobile station are managed as databased location-registration information in a Home Location Register (HLR) Visitor Location Register (VLR) of the private wireless system. The location registration is commonly subdivided into "power-up registration", "power-down registration", "timer-based registration", "distance-based registration", "zone-based registration", "parameter-change registration", "order registration", "implicit registration", "traffic channel registration" and so forth.

The "power-up registration" is location registration in which a mobile station, not having been in use, notifies the private wireless system of its current location and state when its power is turned on. The "power-down registration" is location registration in which power-down of a mobile station is notified to the private wireless system when its power is turned off. The "timer-based registration" is location registration which is periodically carried out in order that a mobile station may be provided with the normal wireless communication service. The "distance-based registration" is location registration which is carried out when a mobile station becomes removed from the last location-registered spot by a certain distance. The "zone-base registration" is location registration in which a new location zone is registered with the private wireless system when the location zone of a mobile station is changed. The "parameter-change registration" is location registration which is carried out when a user intentionally changes parameters stored in a mobile station, such as phone numbers or the like. The "order registration" is location registration which is executed by compulsory order of abase station demanding location registration of a mobile station. The "implicit registration" is location registration which is implicitly carried out at an outgoing call or an incoming call response of a mobile station. The "traffic channel registration" is location registration which is implicitly carried out when a location zone of a mobile station is changed through handoff, etc., during a call. Using the location-registration information according to the above-mentioned location registration, the private wireless system can judge whether it is possible to make a call to a specific subscriber or to provide the relevant subscriber with its service or not.

On the other hand, a location of a mobile station may be known as the unit of a base station on the basis of the location-registration information as stated above. Taking notice of this point, some PLMN service companies are providing location tracking services for allowing to find out a location and a moving route of a subscriber by indicating, on an electronic map, a location of a base station with which the latest location of a mobile station has been registered, that is, a base station which is considered closest to the relevant mobile station.

Such a location tracking service, however, is not put in practice in the private wireless network which uses the location-registration information only for judging whether it is possible to make a call to a specific subscriber or to provide the relevant subscriber with its service or not. Also, even the location tracking services being put in practice in the PLMN do not provide a subdivided location of a subscriber within a service zone covered by each base station, but find out a subscriber's location only as the unit of a base station. In order to enable a subscriber's location to be more precisely tracked within a service zone covered by a base station, it must be required either that a mobile station has a GPS (Global Positioning System) receiver so as to notify a base station of its location information received from a GPS satellite, or that it not only executes location registration whenever it moves over a certain distance, but also it receives, from a base station with which the mobile station has registered its location, latitude and longitude information of the relevant base station, calculates its location on the basis of the received information, and then notifies the network of the calculated location.

SUMMARY OF THE INVENTION

Accordingly, the present invention has been made to solve the above-mentioned problems occurring in the background art, and an object of the present invention is to provide a system and a method for tracking a location of a private wireless network subscriber, which can precisely track and find out a location of a subscriber even within a service zone of a base station and can realize this precise tracking in a simple fashion.

It is another object to provide a system and a method for precisely tracking a location of a private wireless network subscriber without using a global positioning system or executing location registration of a mobile station and receiving latitude and longitude information of a base station.

In order to achieve the above and other objects, there is provided a wireless network system capable of tracking a location of a mobile station including: a visitor location register in which location information relating to a wireless network location of a mobile station is stored; and a base station controller storing location information relating to a wireless network location of a mobile station in said visitor location register when the mobile station registers its location with said wireless network, and confirming a location of the mobile station by dummy paging and updating the location information stored in said visitor location register when the mobile station keeps up an idle state during a certain period.

In accordance with another aspect of the present invention, a private wireless network system capable of tracking a location of a mobile station includes: a private base station controller; at least one repeater dispersedly installed in sector zones of a private base transceiver station; a visitor location register in which location information relating to a private wireless network location of a mobile station is stored, the location information including at least one of a private base transceiver station number, a sector number and a repeater number; and a private base station controller storing location information relating to a private wireless network location of a mobile station in said visitor location register when the mobile station registers its location with said private wireless network, and confirming a location of the mobile station by dummy paging and updating the location information stored in said visitor location register when the mobile station keeps up an idle state during a certain period.

In accordance with another aspect of the invention, a private wireless network system capable of tracking a location of a mobile station includes: a private base station controller; at least one repeater dispersedly installed in sector zones of a private base transceiver station; a visitor location register in which location information relating to a private wireless network location of a mobile station is stored, the location information including at least one of a private base transceiver station number, a sector number and a repeater number; a private base station controller storing location information relating to a private wireless network location of a mobile station in said visitor location register when the mobile station registers its location with said private wireless network, and confirming a location of the mobile station by dummy paging and updating the location information stored in said visitor location register when the mobile station keeps up an idle state during a certain period; and a server inquiring about the location information of the mobile station stored in said visitor location register.

In accordance with another aspect of the invention, a method for tracking a location of a mobile station in a wireless network includes: storing location information relating to a wireless network location of a mobile station in a visitor location register when the mobile station registers its location with said wireless network; confirming a location of the mobile station by dummy paging when the mobile station keeps up an idle state during a certain period; and updating the location information stored in said visitor location register using the confirmed location information of the mobile station.

Additionally, the location information includes at least one of a base transceiver station number, a sector number and a repeater number.

In accordance with another aspect of the present invention, in a private wireless network including a visitor location register in which location information of a mobile station is stored, a method for tracking a location of a mobile station includes: storing, by a private base station controller of said private wireless network, location information relating to a private wireless network location of a mobile station in said visitor location register when the mobile station registers its location with said private wireless network; confirming, by said private base station controller, a location of the mobile station by dummy paging when the mobile station keeps up an idle state during a certain period; and updating the location information stored in said visitor location register using the confirmed location information of the mobile station.

Preferably, the location information includes at least one of a private base transceiver station number, a sector number and a repeater number.

In accordance with another aspect of the present invention, in a private wireless network including at least one repeater dispersedly installed in sector zones of a private base transceiver station and a visitor location register in which location information of a mobile station is stored, a method for tracking a location of a mobile station includes: storing, by a private base station controller of said private wireless network, location information of a mobile station in said visitor location register when the mobile station registers its location with said private wireless network, the location information including at least one of a private base transceiver station number, a sector number and a repeater number with respect to the relevant mobile station; confirming, by said private base station controller, a location of the mobile station by dummy paging when the mobile station keeps up an idle state during a certain period; and updating the location information stored in said visitor location register using the confirmed location information of the mobile station.

In accordance with another aspect of the present invention, in a private wireless network including a visitor location register and a server representing location information of a mobile station, a method for tracking a location of a mobile station includes: storing, by a private base station controller of said private wireless network, location information relating to a private wireless network location of a mobile station in said visitor location register when the mobile station registers its location with said private wireless network; confirming, by said private base station controller, a location of the mobile station by dummy paging when the mobile station keeps up an idle state during a certain period; updating the location information stored in said visitor location register using the confirmed location information of the mobile station; and transmitting, by said private base station controller, the location information of the mobile station to said server when the location information of the mobile station is stored in said visitor location register.

In order to accomplish the above and other objects, there is provided a system for tracking a location of a subscriber in a private wireless network having a plurality of repeaters dispersedly installed in sector zones of a private Base Transceiver Station (pBTS), the system including: a private Base Station Controller (pBSC) connected to the pBTS and a Local Area Network (LAN) and having a Visitor Location Register (VLR); a location tracking server connected to the LAN; and at least one client connected to the LAN, wherein the pBSC stores location information in the VLR when a mobile station executes location registration, the location information including a pBTS number, a sector number and a repeater number with respect to the relevant mobile station, and confirms a location and state of a mobile station by dummy paging and updates its location information stored in the VLR when the relevant mobile station keeps up an idle state during a certain period, the server inquires out the location information stored in the VLR and transmits it to the client, and the client receives location information from the server and provides a user with the location and state of the mobile station according to the received location information. When the client provides a user with the location and state of a mobile station, it displays the location of the mobile station on a screen in which a topographical map of a service zone of the private wireless network is represented.

In order to achieve the above-mentioned and other objects of the present invention, there is also provided a method for tracking a location of a subscriber in a private wireless network including: a step in which a pBSC stores location information when a mobile station executes location registration, the location information including a pBTS number, a sector number and a repeater number with respect to the relevant mobile station, and simultaneously transmits the location information to a server; a step in which the server transmits the location information received from the pBSC to a client; and a step in which the client receives the location information from the server and provides a user with a location and state of a mobile station according to the received location information.

The above-mentioned and other objects of the present invention are fulfilled by another subscriber location tracking method including: a step in which a pBSC stores location information when a mobile station executes location registration, the location information including a pBTS number, a sector number and a repeater number with respect to the relevant mobile station; a step in which a client periodically transmits a message requesting an inquiry about a mobile station subscriber's state to a server; a step in which the server requests a pBSC to inquire out location information stored in a VLR in response to the inquiry message; a step in which the pBSC transmits location information stored in the VLR to the server in response to the server's request; a step in which the server transmits the location information received from the pBSC to the client; and a step in which the client receives the location information from the server and provides a user a location and state of a mobile station according to the received location information.

In accordance with another aspect of the present invention, the above-mentioned and other objects are accomplished by yet another subscriber location tracking method including: a step in which a pBSC stores location information when a mobile station executes location registration, the location information including a pBTS number, a sector number and a repeater number with respect to the relevant mobile station; a step in which a user appoints a specific mobile station and requests a client to inquire about a specific mobile station subscriber's state, and the client transmits a message inquiring about the specific mobile station subscriber's state to a server in response to the user's request; a step in which server requests a pBSC to confirm a location and state of the specific mobile station in response to the client's message; a step in which the pBSC confirms the location and the state of the specific mobile station by dummy paging, updates location information stored in a VLR and transmits the updated location information to the server in response to the server's request; a step in which server transmits the location information received from the pBSC to the client; and a step in which the client receives the location information from the server and provides a user with the location and state of the specific mobile station according to the received location information.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Hereinafter, preferred embodiments of the present invention will be described in detail with reference to the accompanying drawings. In the following description of the present invention, a detailed description of known functions and configurations incorporated herein will be omitted when it may make the subject matter of the present invention rather unclear.

Figure 1:
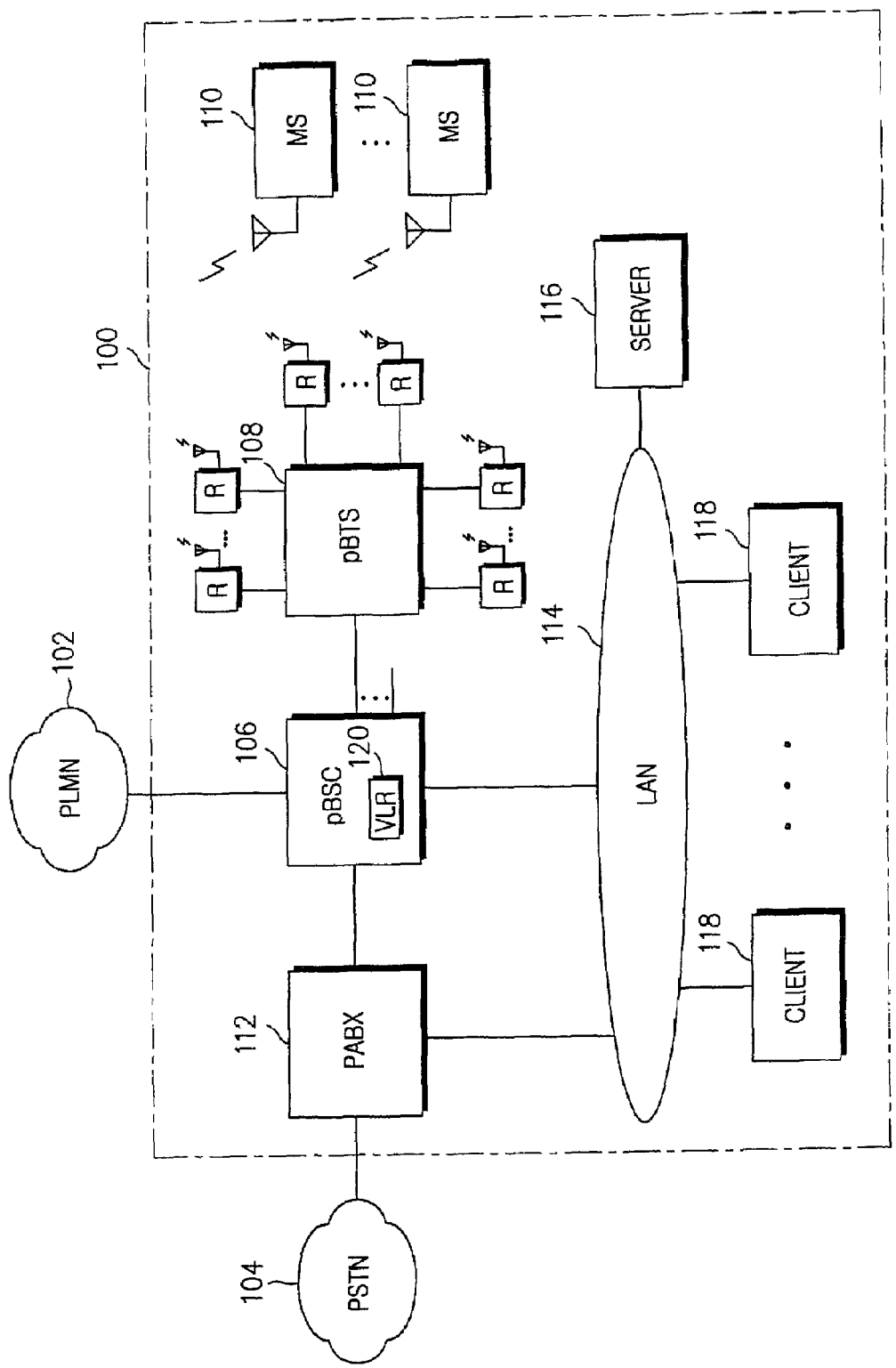
FIG. 1 is a constructional view of a private wireless network including a subscriber location tracking system in accordance with a preferred embodiment of the present invention.

FIG. 1 shows a constructional view of a private wireless network including a subscriber location tracking system in accordance with a preferred embodiment of the present invention. This drawing exemplifies that, as in usual cases, the private wireless network 100 including the subscriber location tracking system in accordance with a preferred embodiment of the present invention interworks with a Public Land Mobile Network (PLMN) 102 and a Public Switched Telephone Network (PSTN) 104. In such a private wireless network 100, a private Base Station Controller (pBSC) 106 is connected to a Private Automatic Branch Exchange (PABX) 112 and the PLMN 102 as well as a plurality of private Base Transceiver Stations (pBTS) 108. As stated above, the pBSC 106 has a Visitor Location Register (VLR) 120 which manages databased location information according to location registration of a plurality of mobile stations 110. The pBTS 108 is connected to a plurality of repeaters R that are dispersedly installed in its own sector zones. A service zone of the pBTS 108 is commonly divided into three sector zones which are referred to as α, β and γ, respectively, and each sector zone is provided with the needed number of repeaters R. For example, one repeater R may be installed at every floor of a building which is serviced with the private wireless network 100. In a case of a building having a large area, one floor may be divided into several sections and one repeater R may be installed at every section. These repeaters R are wirelessly connected to the mobile station 110 to relay communication between the mobile station 110 and the pBTS 108. The PABX 112 and the pBSC 106 are connected to a Local Area Network (LAN) 114. A plurality of clients 118 and a server 116 for providing users of the clients 118 with a subscriber location tracking service in accordance with the present invention are also connected to the LAN 114. As the client 118, a personal computer (PC) is used.

In the private wireless network 100 as stated above, the subscriber location tracking system in accordance with the preferred embodiment of the present invention includes the pBSC 106, the server 116 and the client 118 which are connected to each other via the LAN 114. The pBSC 106 stores a pBTS number, a sector number and a repeater number with respect to a mobile station 110 as location information in the VLR 120. Herein, the pBTS number is a serial number of any one among a plurality of pBTS's 108, which is connected to a mobile station executing location registration. The repeater number is a serial number of any one among a plurality of repeaters R, which is connected to the mobile station executing location registration. Further, the sector number is a serial number of any one among a plurality of sector zones, to which the repeater R connected to the mobile station 110 executing location registration belongs. The fact that the location information includes the pBTS number, the sector number and the repeater number forms the foundation for allowing to find out a location of a mobile station 110 as the unit of a repeater R. That is to say, a location of a mobile station 110 can be more precisely found out than in the PLMN which tracks the location as the unit of a base station. In addition, when any of the plurality of mobile stations 110 keeps up an idle state during a certain period, the pBSC 106 confirms a location and state of the relevant mobile station by dummy paging and updates its location information in the VLR 120. The dummy paging is performed in a similar manner to ordinary paging. In contrast with the ordinary paging, however, it is performed with regard to any mobile station which keeps up an idle state during a certain period, by reason of which it is referred to as "dummy paging". In this way, by performing the dummy paging for a mobile station keeping up the idle state during a certain period to confirm whether the relevant mobile station is inside or outside the private wireless network and to confirm, if the mobile station is inside the private wireless network, what pBTS number, sector number and repeater number correspond to the location of the mobile station, location information of the mobile station keeping up the idle state can be also managed in real time. Furthermore, since this dummy paging is not paging which is performed according to a general call processing process, it is set up in such a manner that it is not counted in paging statistics of the pBSC 106.

Meanwhile, the client 118 receives the location information stored in the VLR 120 of the pBSC 106 from the pBSC 106 through the server 116 and provides a user with a location and state of the relevant mobile station 110 according to the location information. At this time, the client 118 may provide the user with the location and the state of the mobile station 110 as a simple text, but it is preferred that the location of the mobile station 110 is subjected to Graphical User Interface (GUI) processing in the server 116 or the client 118, and the client 118 displays the location of the mobile station 10 on a screen in which a topographical map of a service zone of the private wireless network 100 is represented. In this case, the location of the mobile station 110 is indicated as the unit of a repeater according to the location information of the respective mobile stations 110. In addition, the topographical map of the service zone of the private wireless network 100 is prepared as an electronic map and is stored in the server 116 and the client 118 in is advance. Moreover, the client 118 may provide a user with locations and states of all subscribers' mobile stations of the private network 100 at a time or provide only the location and state of a specific mobile station appointed by a user.

The mode by which the client 118 receives the location information from the server 116 can be divided into three cases, that is, a first case where location registration of a mobile station 110 is executed, a second case where a message inquiring about a subscriber's state is periodically transmitted to the server 116 and a third case where a message inquiring about an appointed subscriber's state is periodically transmitted to the server 116. The first case is a receiving mode in which updated location information is received into the VLR (120) of the pBSC (106) whenever location registration of a mobile station is executed. The second case is a receiving mode in which a message inquiring about a subscriber's state, agreed upon between the client 118 and the server 116, is periodically transmitted to the server 116 and location information is then received as a response to this. Finally, the third case is a receiving mode in which if a user appoints at least one specific mobile station and requests an inquiry about the specific mobile station subscriber's state, a message inquiring about an appointed subscriber's state, agreed upon between the client 118 and the server 116, is transmitted to the server 116 and location information is then received as a response to this. This case corresponds to a case where the user confirms locations and states of a plurality of mobile stations displayed on a screen of the client 118 and then requests the server to find out the current location and state of a specific mobile station.

Figure 2:
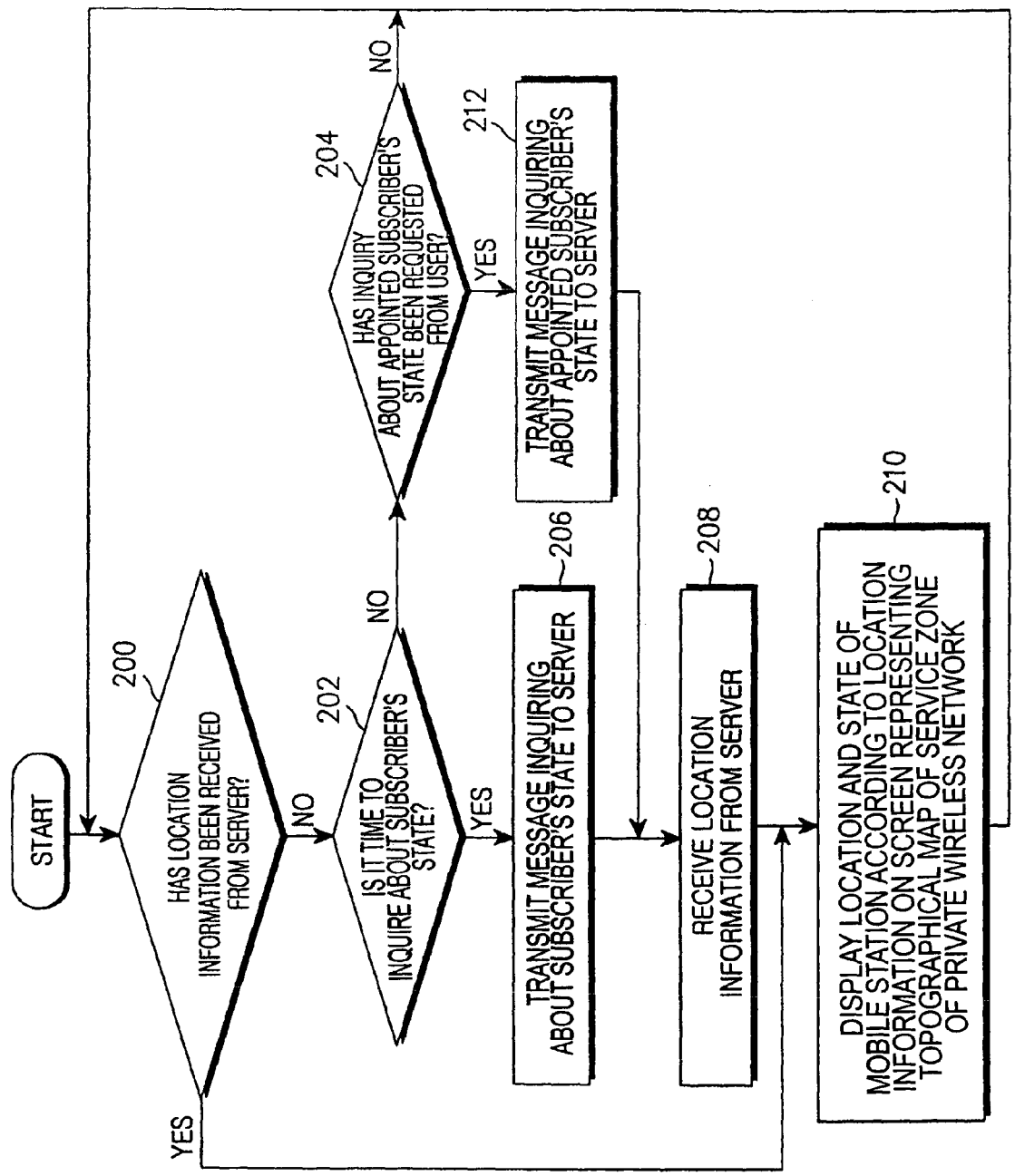
FIG. 2 is a flowchart of processing by a client shown in FIG. 1 in accordance with a preferred embodiment of the present invention.
Figure 3:
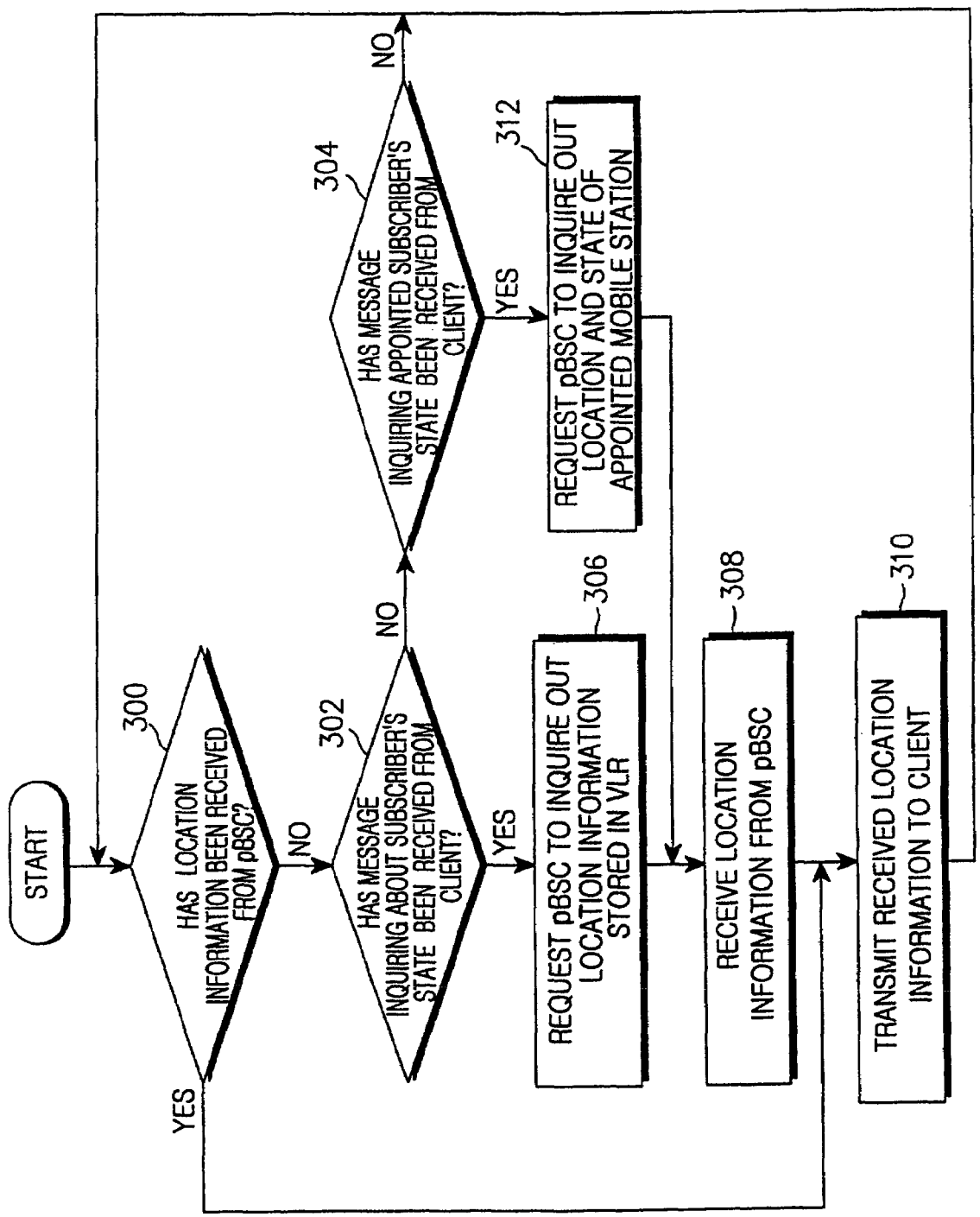
FIG. 3 is a flowchart of processing by a server shown in FIG. 1 in accordance with a preferred embodiment of the present invention.
Figure 4:
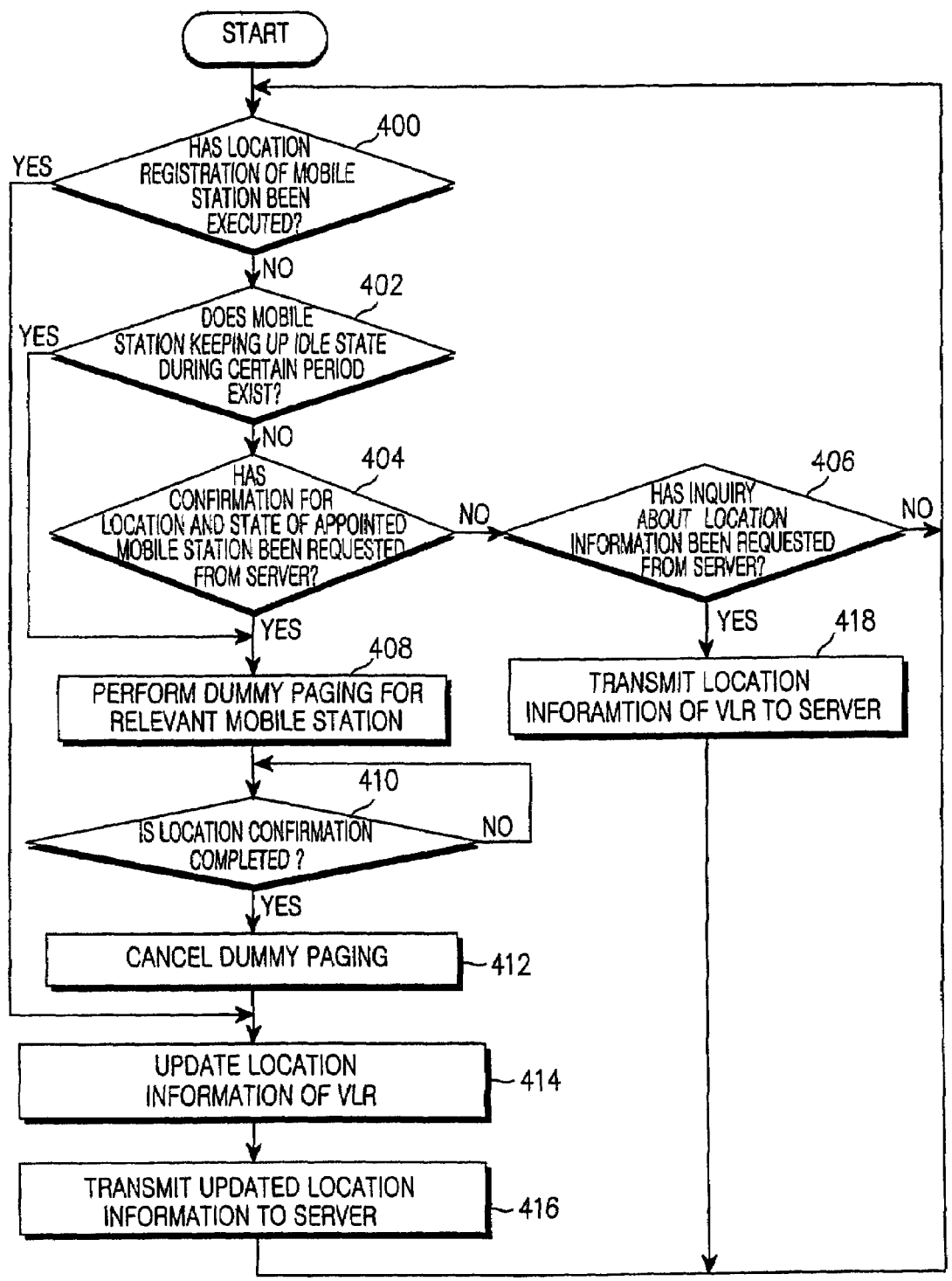
FIG. 4 is a flowchart of processing by a pBSC shown in FIG. 1 in accordance with a preferred embodiment of the present invention.

Hereinafter, a description will be given for subscriber location tracking in accordance with the present invention in conjunction with FIG. 2 showing the respective processing steps 200 to 212 of the client 118, FIG. 3 showing the respective processing steps 300 to 312 of the server 116 and FIG. 4 showing the respective processing steps 400 to 418 of the pBSC in accordance with a preferred embodiment of the present invention.

The client 118 checks in steps 200 to 204 whether location information has been received from the server 116 or not (step 200), whether or not it is time to periodically inquire about a subscriber's state (step 202), and whether an inquiry about an appointed subscriber's state has been requested from a user or not (step 204). At this time, step 210 is performed if the location information has been received from the server 116 (step 200), step 206 is performed if it is time to periodically inquire about a subscriber's state (step 202), and step 212 is performed if an inquiry about an appointed subscriber's state has been requested from a user (step 204). The server 116 checks in steps 300 to 304 whether location information has been received from the pBSC 106 or not (step 300), whether a message inquiring about a subscriber's state has been received from the client 118 or not (step 302), and whether a message inquiring about an appointed subscriber's state has been received from the client 118 or not (step 304). At this time, step 310 is performed if location information has been received from the pBSC 106 (step 300), step 306 is performed if a message inquiring about a subscriber's state has been received from the client 118 (step 302), and step 312 is performed if a message inquiring about an appointed subscriber's state has been received from the client 118 (step 304). Also, the pBSC 106 checks in steps 400 to 406 whether new location registration of a mobile station 110 has been executed or not (step 400), whether a mobile station keeping up an idle state during a certain period exists or not (step 402), whether confirmation for a location and state of an appointed mobile station has been requested from the server 116 or not (step 404), and whether an inquiry about location information has been requested from the server 116 or not (step 406). At this time, step 414 is performed if new location registration of a mobile station has been executed (step 400), step 408 is performed if a mobile station keeping up an idle state during a certain period exists (step 402) or if confirmation for a location and state of an appointed mobile station has been requested from the server 116 (step 404), and step 418 is performed if an inquiry about location information has been requested from the server 116 (step 406).

First, looking into the case when new location registration of a mobile station 110 is executed, the pBSC 106 goes from step 400 to step 414 to update location information including the pBTS number, the sector number and the repeater number according to the location registration of the mobile station in the VLR 126, transmits the updated location information to the server in step 416, and then passes to steps 400 to 406 as stated above. Once that happens, the server 116 goes from step 300 to step 310 to transmit the location information received from the pBSC 106 to the client 118, and then passes to steps 300 to 304 as mentioned above. If done so, the client 118 goes from step 200 to step 210 to display a location and state of the mobile station according to the location information received from the server on a screen in which a topographical map of a service zone of the private wireless network 100 is represented, and then passes to steps 200 to 204 as stated above.

Secondly, looking into the case when a mobile station keeping an idle state during a certain period exists, the pBSC 106 goes from step 402 to step 408 to perform the above-mentioned dummy paging for the relevant mobile station. At this time, time required for the dummy paging must be minimized because other incoming calls are generally treated as busy while the paging progresses. For the purpose of this, as soon as confirmation for a location of the relevant mobile station by the dummy paging is completed in step 410, the dummy paging is cancelled by means of a connection rejection message in step 412. Thereafter, the pBSC 106 goes to step 414 to update the location information according to the confirmation for the location of the mobile station keeping up the idle state during a certain period in the VLR 120, and transmits the updated location information to the server 116 in step 416. Once that happens, the server 116 transmits the location information received from the pBSC 106 to the client 118 in step 310, and the client 118 displays the location and state of the mobile station 110 on the screen, in which the topographical map of the service zone of the private wireless network 100 is represented, in step 210.

Thirdly, looking into the case when the point of time to inquire about a subscriber's state, the client 118 goes from step 202 to step 206 to transmit a message inquiring about a subscriber's state to the server 116. Once that happens, the server 116 goes from step 302 to step 306 to requests the pBSC 106 to inquire out location information stored in the VLR 120, and then passes to step 308. In response to the server's request, the pBSC 106 goes to step 406 to step 418 to transmit the location information of the VLR 120 to the server 116. Once that happens, the server 116 receives the location information from the pBSC 106 in step 308, transmits the received location information to the client 118 in step 310, and then the client 118 displays a location and state of the mobile station 110 on the screen, in which the topographical map of the service zone of the private wireless network 100 is represented, in step 210.

Fourthly, looking into the case when an inquiry about an appointed mobile station subscriber's state is requested from a user, the client 118 goes from step 204 to step 212 to transmit a message inquiring about the appointed mobile station subscriber's state to the server 116, and then passes to step 208. Once that happens, the server 116 goes from step 304 to step 312 to request the pBSC 106 to inquire out a location and state of the appointed mobile station, and then passes to step 308. In response to the server's request, the pBSC 106 goes to step 404 to step 408 to perform dummy paging for the mobile station appointed by the user, cancels the dummy paging if confirmation for the location of the mobile station is completed in step 410, passes to step 414 to update location information according to the confirmation for the location of the appointed mobile station in the VLR 120, and then transmits the updated location information to the server 116 in step 416. Once that happens, the server 116 transmits the location information received from the pBSC 106 to the client 118 in step 310, and then the client 118 displays the location and the state of the mobile station 110 appointed by the user on the screen, in which the topographical map of the service zone of the private wireless network 100 is represented, in step 210.

Consequently, the subscriber location tracking in accordance with the present invention has an advantage in that not only a subscriber's location can be precisely tracked up to the unit of a repeater R in the private wireless network 100 without using the GPS or executing location registration of a mobile station and receiving latitude and longitude information of a base station, but also this precise subscriber location tracking can be realized in a simple fashion.

While the invention has been shown and described with reference to certain preferred embodiments thereof, it will be understood by those skilled in the art that various changes in form and details may be made therein without departing from the spirit and scope of the invention. In particular, the mode by which the client 118 receives the location information from the server 116 has been exemplified in connection with all the cases when location registration of a mobile station 110 is executed, a message inquiring about a subscriber's state is periodically transmitted to the server 116 and a message inquiring about an appointed subscriber's state is transmitted to the server 116, but any case can be selectively applied to the receiving mode as occasion demands. In addition, one example in which the server 116 inquires about location information of the VLR 120 provided in the pBSC 106 and transmits it to the client 118 has been given, but a VLR which maintains location information in the same manner as the VLR 120 of the pBSC 106 can be also realized in the server 116. If done so, when the server receives a message inquiring about a subscriber's state from the client 118, the server only have to inquire about location information of its own VLR and to transmit the location information to the client 118 without inquiring of the VLR 120 of the pBSC 106, as a result of which the inquiry can be quickly processed and a load of the pBSC 106 can be relieved. In this case, if the server 116 updates its own VLR whenever it receives location information from the pBSC 106, the same location information as that of the VLR 120 of the pBSC 106 can be maintained. Accordingly, the scope of the invention should not be limited to the embodiments, but should be defined by the appended claims and equivalents thereof.

What is claimed is:

1. A wireless network system capable of tracking a location of a mobile station, comprising:
   a base station controller; and
   a visitor location register in which location information relating to a wireless network location of the mobile station is stored;
   wherein the base station controller stores the location information relating to the wireless network location of the mobile station in said visitor location register when the mobile station registers its location with said wireless network, and wherein the base station controller confirms the location of the mobile station by dummy paging and updates the location information stored in said visitor location register when the mobile station keeps up an idle state during a certain period.

2. A private wireless network system capable of tracking a location of a mobile station, comprising:
   at least one repeater dispersedly installed in sector zones of a private base transceiver station;
   a private base station controller; and
   a visitor location register in which location information relating to a private wireless network location of a mobile station is stored, the location information including at least one of a private base transceiver station number and a repeater number; and
   said private base station controller storing the location information relating to the private wireless network location of the mobile station in said visitor location register when the mobile station registers its location with said private wireless network, and confirming the location of the mobile station by dummy paging and updating the location information stored in said visitor location register when the mobile station keeps up an idle state during a certain period.

3. A private wireless network system capable of tracking a location of a mobile station, comprising:
   a plurality of repeaters dispersedly installed in sector zones of a private base transceiver station;
   a private base station controller; and
   a visitor location register in which location information relating to a private wireless network location of a mobile station is stored, the location information including at least one of a private base transceiver station number and a repeater number;
   said private base station controller storing the location information relating to the private wireless network location of the mobile station in said visitor location register when the mobile station registers its location with said private wireless network, and confirming a location of the mobile station by dummy paging and updating the location information stored in said visitor location register when the mobile station keeps up an idle state during a certain period;
   said system further comprising a server for inquiring about the location information of the mobile station stored in said visitor location register.

4. The private wireless network system of claim 3, said server being connected to said private base station controller through a local area network, the plurality of repeaters being connected to the private base transceiver station, and the private base transceiver station being connected to said private base station controller.

5. The private wireless network system of claim 4, further comprising a client which is informed of the location information by said server, said client being connected to said server, said server not accommodating a communication link between mobile stations.

6. A method for tracking a location of a mobile station in a wireless network, comprising the steps of:
   providing a visitor location register;
   storing, by the base station controller, location information relating to a wireless network location of a mobile station in the visitor location register when the mobile stall on registers its location with said wireless network;
   confirming, by the base station controller, a location of the mobile station by dummy paging when the mobile station keeps up an idle state during a certain period; and
   updating the location information stored in the visitor location register using information corresponding to the confirmed location of the mobile station.

7. The method according to claim 6, wherein the location information includes at least one of a base transceiver station number and a repeater number.

8. In a private wireless network including a visitor location register in which location information of a mobile station is stored, a method for tracking a location of the mobile station, comprising the steps of:
   storing, by a private base station controller of said private wireless network, location information relating to a private wireless network location of the mobile station in said visitor location register when the mobile station registers its location with said private wireless network;
   confirming, by said private base station controller of said private wireless network, the location of the mobile station by dummy paging when the mobile station keeps up an idle state during a certain period; and
   updating the location information stored in said visitor location register using information corresponding to the confirmed location of the mobile station.

9. The method according to claim 8, wherein the location information includes at least one of a private base transceiver station number and a repeater number.

10. In a private wireless network including at least one repeater dispersedly installed in sector zones of a private base transceiver station and a visitor location register in which location information of a mobile station is stored, a method for tracking a location of the mobile station, comprising the steps of:
    storing, by a private base station controller of said private wireless network, the location information of the mobile station in said visitor location register when the mobile station registers its location with said private wireless network, the location information including at least one of a private base transceiver station number and a repeater number with respect to the mobile station;
    confirming, by said private base station controller of said private wireless network, the location of the mobile station by dummy paging when the mobile station keeps up an idle state during a certain period; and
    updating the location information stored in said visitor location register using information corresponding to the confirmed location of the mobile station.

11. In a private wireless network including a visitor location register and a server representing location information of a mobile station, a method for tracking a location of a mobile station, comprising the steps of:
    storing, by a private base station controller of said private wireless network, location information relating to a private wireless network location of the mobile station in said visitor location register when the mobile station registers its location with said private wireless network;

confirming, by said private base station controller of said private wireless network, the location of the mobile station by dummy paging when the mobile station keeps up an idle state during a certain period;

updating the location information stored in said visitor location register using information corresponding to the confirmed location of the mobile station; and transmitting, by said private base station controller, the location information of the mobile station to said server when the location information of the mobile station is stored in said visitor location register.

12. A method for tracking a location of a subscriber mobile station, comprising the steps of:

providing private base station controller;

providing a visitor location register;

storing location information when the subscriber mobile station executes location registration, the location information including a private base transceiver station number, a sector number and a repeater number with respect to the subscriber mobile station;

periodically transmitting, to a server, an inquiry message about a state of the subscriber mobile station;

requesting, by the server, the private base station controller to access location information stored in the visitor location register in response to the inquiry message;

transmitting, by the private base station controller, location information stored in the visitor location register to the server in response to the requesting by the server;

transmitting, by the server, the location information received from said private base station controller to a client;

receiving, by the client, the location information from said server, and providing a user with a location and a state of a mobile station according to the received location information; and confirming, by the base station controller, the location and the state of the subscriber mobile station by dummy paging and updating the location information of said visitor location register when the mobile station keeps up an idle state during a certain period, and then transmitting the updated location information to said server.

13. The method according to claim 12, further comprising the step of transmitting the location information stored in said visitor location register directly to the server, remote from the visitor location register, in response to the requesting by the server.

14. A method for tracking a location of a subscriber, comprising the steps of:

providing a private base station controller;

providing a visitor location register;

storing location information when a mobile station executes location registration, the location information including a private base transceiver station number and a repeater number with respect to the mobile station;

designating a subscriber mobile station, and requesting a client to inquire about a state of the subscriber mobile station, the client transmitting a message inquiring about the state of the subscriber mobile station to a server in response to a request by a user;

requesting the private base station controller to confirm a location and the state of the subscriber mobile station in response to the message transmitted by the client; and confirming, by the private base station controller, the location and the state of the subscriber mobile station by dummy paging, updating location information stored in the visitor location register, and transmitting, by the private base station controller, the updated location information to said server in response to a request by the server.

15. The method according to claim 14, further comprising the steps of:

transmitting, to the client, the location information transmitted by said private base station controller; and receiving, by the client, location information transmitted by said server, and providing a user with the location and the state of the subscriber mobile station according to the received location information.

16. The method of claim 15, said client being connected to said server, said server being connected to said private base station controller through a certain network, a plurality of repeaters being connected to the private base transceiver station, and the private base transceiver station being connected to said private base station controller.

* * * * *